(12) United States Patent
Edamoto et al.

(10) Patent No.: US 7,882,392 B2
(45) Date of Patent: Feb. 1, 2011

(54) ELECTRONIC DEVICE AND METHOD OF CONTROLLING ELECTRONIC DEVICE

(75) Inventors: Manami Edamoto, Kyoto (JP); Shuji Kawakatsu, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 367 days.

(21) Appl. No.: 12/120,278

(22) Filed: May 14, 2008

(65) Prior Publication Data

US 2008/0288803 A1 Nov. 20, 2008

(30) Foreign Application Priority Data

May 18, 2007 (JP) .............................. 2007-132387

(51) Int. Cl.
*G06F 11/00* (2006.01)
(52) U.S. Cl. .......................... 714/14; 714/22
(58) Field of Classification Search .................. 714/14, 714/22
See application file for complete search history.

(56) References Cited

U.S. PATENT DOCUMENTS

| | | | | |
|---|---|---|---|---|
| 4,234,920 A | * | 11/1980 | Van Ness et al. | 714/22 |
| 5,400,341 A | * | 3/1995 | Makino et al. | 713/340 |
| 5,564,010 A | * | 10/1996 | Henry et al. | 714/22 |
| 5,721,887 A | * | 2/1998 | Nakajima | 713/500 |
| 6,629,248 B1 | * | 9/2003 | Stachura et al. | 713/340 |
| 2006/0242458 A1 | * | 10/2006 | Feldman et al. | 714/14 |
| 2008/0086659 A1 | * | 4/2008 | Ishikawa et al. | 714/22 |

FOREIGN PATENT DOCUMENTS

| | | |
|---|---|---|
| JP | 64-066720 A | 3/1989 |
| JP | 64-072217 A | 3/1989 |
| JP | 05-092834 U | 12/1993 |
| JP | 07-114401 A | 5/1995 |
| JP | 08-223017 A | 8/1996 |
| JP | 08-275391 A | 10/1996 |
| JP | 10-111739 A | 4/1998 |
| JP | 2000-75968 A | 3/2000 |
| JP | 2000-339069 A | 12/2000 |
| JP | 2001-046710 A | 2/2001 |

OTHER PUBLICATIONS

Official communication issued in the counterpart Japanese Application No. 2007-132387, mailed on Jun. 2, 2009.
Official communication issued in counterpart Japanese Application No. 2007-132387, mailed on Feb. 5, 2009.

* cited by examiner

*Primary Examiner*—Robert Beausoliel
*Assistant Examiner*—Charles Ehne
(74) *Attorney, Agent, or Firm*—Keating & Bennet, LLP

(57) ABSTRACT

An electronic device includes a power supply unit that generates plural output voltages from an input voltage and outputs the various output voltages from respective plural power supply channels, a voltage detecting unit that monitors voltages of two power supply channels among plural power supply channels which are different in decreases of the output voltage in the case that the input voltage is cut off, outputs a first detecting signal upon detecting a decrease in voltage of a first power supply channel having a fast decrease to a first threshold and outputs a second detecting signal upon detecting a decrease in voltage of a second power supply channel having a slow decrease to a second threshold, and a control unit that saves data upon receiving the first detecting signal and stops an operation of the electronic device upon receiving the second detecting signal.

11 Claims, 2 Drawing Sheets

ELECTRONIC DEVICE AND METHOD OF CONTROLLING ELECTRONIC DEVICE

CROSS-REFERENCE TO RELATED APPLICATIONS

This application claims priority under 35 U.S.C. 119 to Japanese Patent Application No. 2007-132387, filed on May 18, 2007, which application is hereby incorporated by reference in its entirety.

BACKGROUND OF THE INVENTION

1. Field of the Invention

The present invention relates to an electronic device for carrying out a process of saving data in a case in which a power supply voltage is suddenly cut off, such as a case in which a commercial alternating current power source is broken down, and a method of controlling the same.

2. Description of the Related Art

In an electronic device using a micro-processing unit (MPU), in the case that the power supply voltage is suddenly cut off, a data saved in a non-volatile memory is the data stored in a random access memory (RAM) at that time. For example, in a known technology, an integrated circuit (IC) for power monitor is used for monitoring the power supply voltage and outputting a signal to a non maskable interrupt (NMI) terminal of the MPU so as to save the data into a non-volatile memory when a decrease in the power supply voltage is detected. Further, in another known technology, a reset signal is outputted when the power is turned off so as to prevent a circuit in the electronic device from malfunctioning.

In a typical electronic device, the MPU starts saving of data when a detection signal indicating a decrease in power supply voltage, the signal outputted from the IC for power monitoring, is inputted to the NMI terminal of the MPU. The detection signal is delayed for a fixed period of time by means of a delay circuit to form a reset signal. The MPU stops an operation of the electronic device in accordance with the reset signal.

In the related art described above, a delay circuit must be provided in order to secure the time for saving the data stored in the RAM in the non-volatile memory in the case of the decrease in power supply voltage. This makes a structure of the electronic device complicated.

SUMMARY OF THE INVENTION

In order to overcome the problems described above, preferred embodiments of the present invention provide an electronic device for certainly saving the data with no special circuit such as a delay circuit in the case that the power supply voltage is cut off, and a method of controlling the same.

According to a first preferred embodiment of the present invention, an electronic device includes: a power supply unit that generates plural output voltages from an input voltage and that outputs the respective output voltages from plural power supply channels, respectively; a voltage detecting unit that monitors voltages of two power supply channels among plural power supply channels which are different in the decrease of the output voltage in the case that the input voltage is cut off, outputs a first detecting signal upon detecting a decrease in voltage of a first power supply channel having a fast decrease to a first threshold and outputs a second detecting signal upon detecting a decrease in voltage of a second power supply channel having a slow decrease to a second threshold; and a control unit that saves data upon receiving the first detecting signal and stops an operation of the electronic device upon receiving the second detecting signal.

According to a second preferred embodiment of the present invention, current capacity of the second power supply channel is set to be larger than that of the first power supply channel.

According to a third preferred embodiment of the present invention, a regular voltage of the first power supply channel is about 5.0 volts and a regular voltage of the second power supply channel is about 3.3 volts, for example.

According to the above-described first preferred embodiment of the present invention, the first detecting signal is outputted to the control unit when the voltage detecting unit detects a decrease in voltage of the first power supply channel having a fast decrease to the first threshold in the case that input voltage is cut off due to a breakdown, for example. The control unit saves data upon receiving the first detecting signal. The second detecting signal is outputted to the control unit when the voltage detecting unit detects a decrease in voltage of the second power supply channel having a slow decrease to the second threshold. The control unit stops an operation of the electronic device upon receiving the second detecting signal.

It is arranged that a difference in time required for the decrease of the voltage of the two power supply channels be used for carrying out a process of saving the data and for stopping the operation of the electronic device. This makes the delay circuit used in the prior art unnecessary, so that an electronic device with a comparatively simple structure can be achieved. Decreases of voltage of the power supply channels are stable and small in variation. This causes the data to be securely saved by the time when the operation of the electronic device is stopped.

According to the above-described second preferred embodiment of the present invention, the current capacity of the second power supply channel is set to be larger than that of the first power supply channel. This causes a decrease of the voltage of the second power supply channel to be slower than the decrease of the voltage of the first power supply channel. In a typical electronic device, the current capacity of the power supply channel used as a main channel is set at the largest value since the number of devices is supplied with. Accordingly, a main power supply channel and a subsidiary power supply channel need be used in the electronic device.

According to the above-described third preferred embodiment of the present invention, in the case of the electronic device in which the power supply channel having a regular voltage value of about 3.3 volts is used as a main power supply channel while the power supply channel having a regular voltage value of about 5.0 volts is used as a subsidiary power supply channel, the two power supply channels are thus used.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
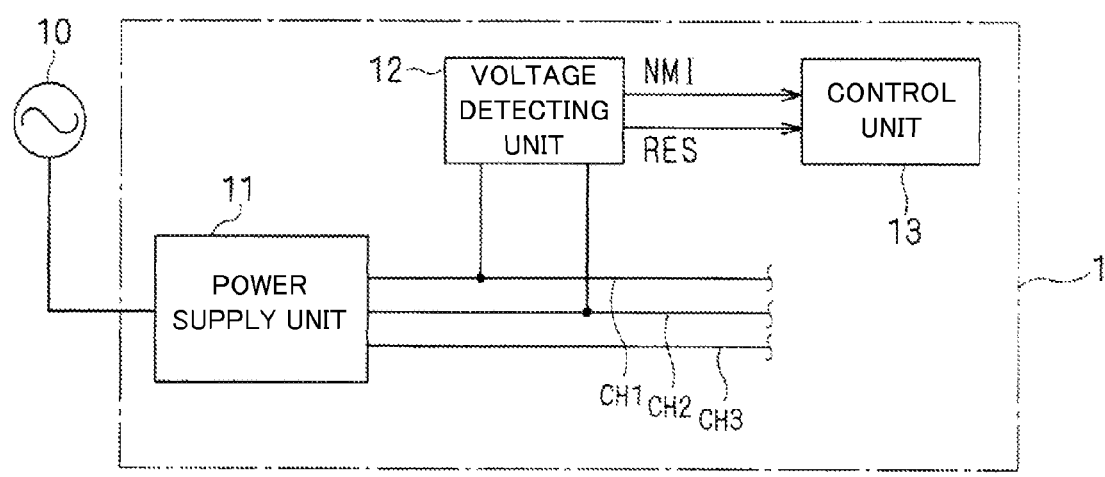
FIG. 1 is a block diagram schematically illustrating an electronic device in accordance with a preferred embodiment of the present invention.

FIG. 1 is a block diagram schematically illustrating an electronic device 1 in accordance with a preferred embodiment of the present invention. The electronic device 1 includes a power supply unit 11 used as a power supplier, a voltage detecting unit 12 and a control unit 13.

The power supply unit 11 forms plural kinds (for example, three kinds in the present preferred embodiment) of output voltage on the basis of the input voltage supplied from a commercial alternating current power supply 10 to output the three kinds of output voltage from first to third power supply channels CH1, CH2 and CH3, respectively. The power supply unit 11 outputs the output voltage having a regular voltage value of about 5.0 volts to the first power supply channel CH1, the output voltage having a regular voltage value of about 3.3 volts to the second power supply channel CH2 in the present preferred embodiment.

In the electronic device 1, the power supply channel with the regular voltage value of about 3.3 volts is used as a main power supply channel while the power supply channel with the regular voltage value of about 5.0 volts is used as a subsidiary power supply channel. The current capacity of the second power supply channel CH2 is set at a value both larger than that of the current capacity of the first power supply channel CH1 and the third power supply channel CH3. Such a difference in current capacity causes a decrease in output voltage of the first power supply channel CH1 to be faster than a decrease in output voltage of the second power supply channel CH2 upon cutting off the input voltage.

The voltage detecting unit 12 monitors voltage values of two power supply channels which take different times for decrease of the output voltage upon cutting off the input voltage, that is, the first and second power supply channels CH1 and CH2. The voltage detecting unit 12 then outputs to the control unit 13 an NMI signal for giving an instruction to start saving the data when it detects that the voltage value of the first power supply channel CH1 having a fast decrease has decreased to a first threshold TH1. The first threshold TH1 is set at about 4.7 or about 4.8 volts, for example.

The voltage detecting unit 12 outputs a reset signal RES for stopping an operation of the electronic device 1 to the control unit 13 when it detects that the voltage value of the power supply channel CH2 having a slow decrease has decreased to a second threshold TH2. The second threshold TH2 is set at about 3.0 volts, for example.

The control unit 13 preferably includes an MPU, a RAM, a non-volatile memory and such. The control unit 13 saves data upon receiving the signal NMI. The saving of data is a process of writing data stored in the RAM in the non-volatile memory, for example. Furthermore, the control unit 13 stops an operation of the electronic device 1 upon receiving the reset signal RES.

Figure 2:
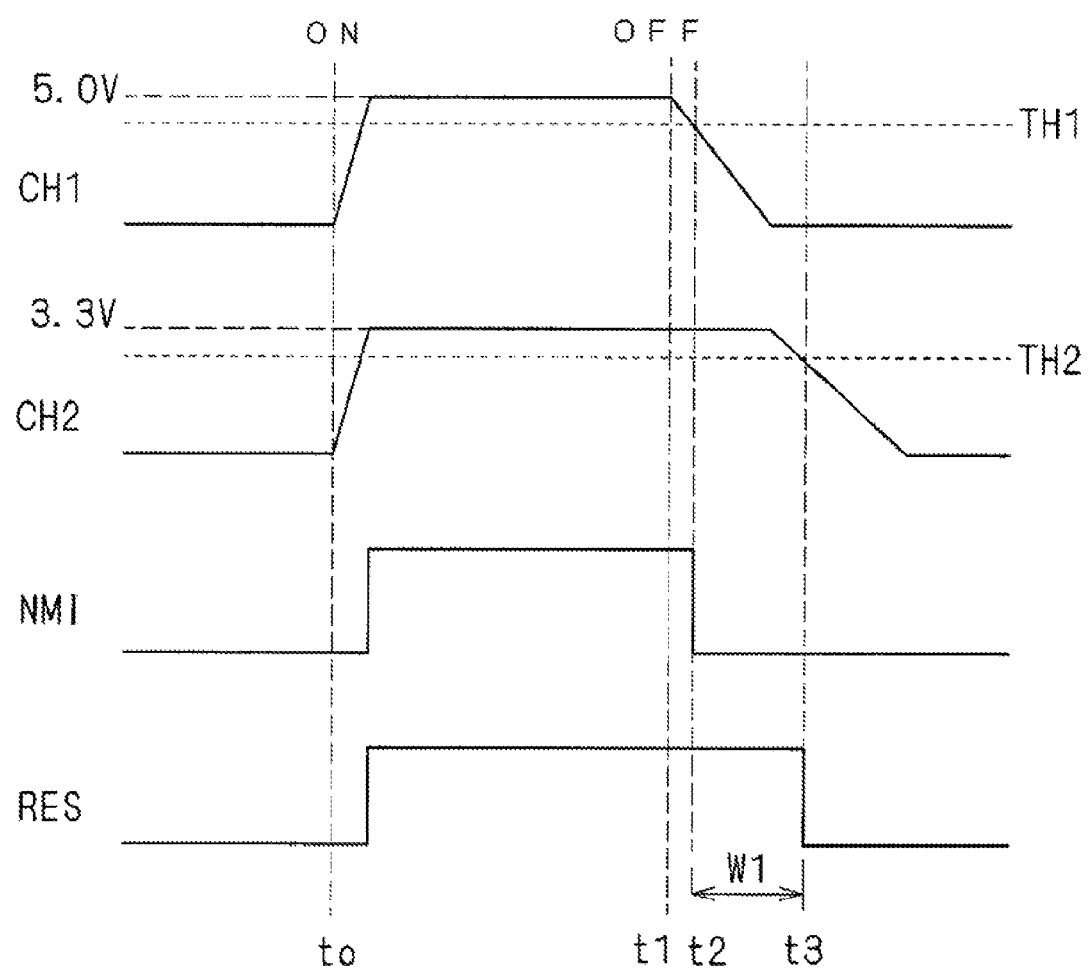
FIG. 2 is a timing chart illustrating an operation of the electronic device when cutting off the input voltage.

FIG. 2 is a timing chart illustrating an operation of the electronic device 1 while cutting off the input voltage. The input voltage is supplied to the power supply unit 11 from the commercial alternating current power source 10 when a power supply switch of the electronic device 1 is turned on (at time t0). The power supply unit 11 raises the output voltage of the first power supply channel CH1 to about 5.0 volts and the output voltage of the second power supply channel CH2 to about 3.3 volts. On the other hand, the voltage detecting unit 12 sets the start signal NMI and the reset signal RES at a high level, respectively. The start signal NMI and the reset signal RES are active low signals.

The example will now be considered where the input voltage from the commercial alternating current power source 10 is cut off due to breakdown at the time t1. The voltage value of the output voltage is immediately decreases and reaches the first threshold TH1 at time t2 since the current capacity of the first power supply channel CH1 is smaller than that of the second power supply channel CH2 as described above. The voltage detecting unit 12 sets the signal NMI at a low level when it detects that the voltage value of the first power supply channel CH1 decreased to the first threshold TH1 (at the time t2). This causes the control unit 13 to start saving the data.

The current capacity of the second power supply channel CH2 is larger than that of the first power supply channel CH1. The voltage value of the output voltage is kept at around 3.3 volts for a fixed period of time, and then, decreases to the second threshold TH2 at time t3. The voltage detecting unit 12 sets the reset signal RES at a low level when it detects that the voltage value of the second power supply channel CH2 decreased to the second threshold value TH2 (at the time t3). This causes the control unit 13 to stop an operation of the electronic device 1. Therefore, a period of time W1 from the time t2 to the time t3 is secured as a period of time for saving the data in the electronic device 1.

As described above, according to the present preferred embodiment, it is arranged that a difference in times required for the decrease of the voltage value of the two power supply channels CH1 and CH2 be utilized for saving the data and for stopping the operation of the electronic device 1. This makes the delay circuit used in the prior art unnecessary, so that a comparatively simple structure can be achieved. Further, decreases of voltage values of the power supply channels CH1 and CH2 are stable and small in variation. The data can be certainly saved by the time when the operation of the electronic device 1 is stopped.

In the present preferred embodiment, the first and second power supply channels CH1 and CH2 are preferably used as a combination of two power supply channels. Another combination of power supply channels, however, may be similarly put into practice so long as it can secure the sufficient period of time for saving the data.

The present invention is applicable to various kinds of electronic devices such as a facsimile apparatus and a network multi-function peripheral so long as the electronic device includes an MPU, a RAM and a non-volatile memory.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that decrease within the true spirit and scope of the present invention.

What is claimed is:

1. An electronic device comprising:
   a power supply unit arranged to generate plural output voltages from an input voltage, the plural output voltages output from respective plural power supply channels;
   a voltage detecting unit arranged to monitor voltages of two power supply channels among the plural power supply channels which are different in decreases of the output voltage when the input voltage is cut off, to output a first detecting signal upon detecting a decrease in voltage of a first power supply channel having a fast decrease to a first threshold, and to output a second detecting signal upon detecting a decrease in voltage of a second power supply channel having a slow decrease to a second threshold; and a control unit arranged to save data upon receiving the first detecting signal and for stopping an operation of the electronic device upon receiving the second detecting signal.

2. The electronic device according to claim 1, wherein current capacity of the second power supply channel is larger than that of the first power supply channel.

3. The electronic device according to claim 1, wherein the control unit includes an MPU and the first detecting signal is inputted to an NMI terminal of the MPU.

4. The electronic device according to claim 1, wherein the control unit includes an MPU and the second detecting signal is inputted to a reset terminal of the MPU.

5. An electronic device comprising:

means for generating plural output voltages from an input voltage and outputting the various output voltages from respective plural power supply channels;

means for monitoring voltages of two power supply channels among plural power supply channels which are different in decreases of the output voltage when the input voltage is cut off;

means for outputting a first detecting signal upon detecting a decrease in voltage of a first power supply channel having a fast decrease to a first threshold;

means for outputting a second detecting signal upon detecting a decrease in voltage of a second power supply channel having a slow decrease to a second threshold; and means for saving data upon receiving the first detecting signal and for stopping an operation of the electronic device upon receiving the second detecting signal.

6. The electronic device according to claim 5, wherein current capacity of the second power supply channel is larger than that of the first power supply channel.

7. The electronic device according to claim 5, further comprising means for inputting the first detecting signal to an NMI terminal of the MPU.

8. The electronic device according to claim 5, further comprising means for inputting the second detecting signal to a reset terminal of the MPU.

9. A method of controlling an electronic device, comprising steps of:

generating plural output voltages from an input voltage and outputting the various output voltages from respective plural power supply channels;

outputting a first detecting signal upon detecting a decrease in voltage of a first power supply channel having a fast decrease to a first threshold;

outputting a second detecting signal upon detecting a decrease in voltage of a second power supply channel having a slow decrease to a second threshold;

saving data into a non-volatile memory from a volatile memory upon receiving the first detecting signal; and stopping an operation of the electronic device upon receiving the second detecting signal.

10. The method of controlling an electronic device according to claim 9, further comprising the step of inputting the first detecting signal to an NMI terminal of the MPU.

11. The method of controlling an electronic device according to claim 9, further comprising the step of inputting the second detecting signal to a reset terminal of the MPU.

* * * * *